United States Patent
Buelow et al.

(10) Patent No.: US 12,458,302 B2
(45) Date of Patent: Nov. 4, 2025

(54) SYSTEMS AND METHODS FOR PROCESSING AND VISUALIZING TUBE CURRENT MODULATIONS IN MEDICAL IMAGING DEVICES

(71) Applicant: KONINKLIJKE PHILIPS N.V., Eindhoven (NL)

(72) Inventors: Thomas Buelow, Grosshansdorf (DE); Tim Philipp Harder, Ahrensburg (DE); Hrishikesh Narayanrao Deshpande, Hamburg (DE); Axel Saalbach, Hamburg (DE); Christopher Brian Martel, Cambridge, MA (US); Stewart Matthew Young, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 184 days.

(21) Appl. No.: 18/558,646

(22) PCT Filed: Apr. 28, 2022

(86) PCT No.: PCT/EP2022/061343
§ 371 (c)(1),
(2) Date: Nov. 2, 2023

(87) PCT Pub. No.: WO2022/233704
PCT Pub. Date: Nov. 10, 2022

(65) Prior Publication Data
US 2024/0237955 A1    Jul. 18, 2024

Related U.S. Application Data

(60) Provisional application No. 63/184,294, filed on May 5, 2021.

(51) Int. Cl.
*A61B 6/03* (2006.01)

(52) U.S. Cl.
CPC .................... *A61B 6/032* (2013.01)

(58) Field of Classification Search
CPC .................................................... A61B 6/032
See application file for complete search history.

(56) References Cited

U.S. PATENT DOCUMENTS 5,379,333 A     1/1995  Toth
5,400,378 A  *  3/1995  Toth .................. A61B 6/488
                                                378/118
(Continued)

FOREIGN PATENT DOCUMENTS

JP    2002177261 A    6/2002
JP    2005143948 A    6/2005
JP    2011152325 A    8/2011

OTHER PUBLICATIONS

PCT International Search Report, International application No. PCT/EP2022/061343, Jul. 15, 2022.
(Continued)

*Primary Examiner* — Blake C Riddick
(74) *Attorney, Agent, or Firm* — Larry Liberchuk

(57) ABSTRACT

When performing an imaging scan on a patient, x-ray tube currents are modulated as the scan is performed. The x-ray tube current values and modulations may be recorded and accessed. The accessed values may be processed to generate overlays and displays for identifying patient and diagnostic device issues.

20 Claims, 8 Drawing Sheets

(56) References Cited

U.S. PATENT DOCUMENTS

| | | | |
|---|---|---|---|
| 5,450,462 A * | 9/1995 | Toth | A61B 6/488 378/108 |
| 5,485,494 A * | 1/1996 | Williams | A61B 6/4078 378/16 |
| 5,696,807 A * | 12/1997 | Hsieh | H05G 1/44 378/109 |
| 6,094,468 A * | 7/2000 | Wilting | A61B 6/032 378/8 |
| 6,744,846 B2 * | 6/2004 | Popescu | H05G 1/34 378/4 |
| 6,754,301 B2 * | 6/2004 | Horiuchi | A61B 6/56 378/4 |
| 7,072,437 B2 | 7/2006 | Seto | |
| 8,229,059 B2 | 7/2012 | Mukumoto | |
| 8,848,860 B2 * | 9/2014 | Yazaki | H05G 1/34 378/8 |
| 9,649,079 B1 * | 5/2017 | Guntzer | G06T 7/0012 |
| 9,844,357 B2 | 12/2017 | Lee | |
| 2003/0043961 A1 * | 3/2003 | Horiuchi | A61B 6/56 378/21 |
| 2003/0097062 A1 * | 5/2003 | Toth | A61B 6/465 600/425 |
| 2004/0032928 A1 * | 2/2004 | Toth | A61B 6/544 378/108 |
| 2004/0062341 A1 * | 4/2004 | Popescu | A61B 6/032 378/8 |
| 2004/0101105 A1 * | 5/2004 | Segawa | A61B 6/032 378/108 |
| 2004/0161139 A1 * | 8/2004 | Samara | G06F 16/583 707/E17.02 |
| 2004/0202277 A1 * | 10/2004 | Okumura | A61B 6/465 378/16 |
| 2005/0041772 A1 * | 2/2005 | Nishide | G01N 23/046 378/19 |
| 2005/0089135 A1 * | 4/2005 | Toth | A61B 6/488 378/16 |
| 2005/0089136 A1 * | 4/2005 | Toth | A61B 6/544 378/16 |
| 2005/0089137 A1 * | 4/2005 | Toth | A61B 6/544 378/19 |
| 2005/0089138 A1 * | 4/2005 | Toth | A61B 6/032 378/20 |
| 2005/0152493 A1 * | 7/2005 | Seto | A61B 6/542 378/20 |
| 2005/0185759 A1 * | 8/2005 | Toth | A61B 6/542 378/109 |
| 2006/0013358 A1 * | 1/2006 | Seto | A61B 6/032 378/16 |
| 2006/0109950 A1 * | 5/2006 | Arenson | A61B 6/482 378/4 |
| 2006/0262896 A1 * | 11/2006 | Nishide | A61B 6/469 378/15 |
| 2006/0285634 A1 * | 12/2006 | Toth | A61B 6/488 378/16 |
| 2007/0053483 A1 * | 3/2007 | Nagata | A61B 6/032 378/8 |
| 2007/0116171 A1 * | 5/2007 | Hsieh | A61B 6/488 378/8 |
| 2007/0116172 A1 * | 5/2007 | Hsieh | A61B 6/032 378/8 |
| 2007/0116337 A1 * | 5/2007 | Toth | G06T 7/11 382/128 |
| 2007/0211845 A1 * | 9/2007 | Nishide | A61B 6/04 378/4 |
| 2007/0258559 A1 * | 11/2007 | Hur | A61B 6/583 378/109 |
| 2007/0286332 A1 * | 12/2007 | Gohno | A61B 6/488 378/15 |
| 2008/0103834 A1 * | 5/2008 | Reiner | G16H 20/40 705/3 |
| 2008/0123920 A1 * | 5/2008 | Toth | A61B 6/544 378/4 |
| 2009/0016484 A1 * | 1/2009 | Wang | A61B 6/465 378/19 |
| 2009/0092224 A1 * | 4/2009 | Nishide | A61B 6/542 378/13 |
| 2009/0122952 A1 * | 5/2009 | Nishide | A61B 6/542 378/4 |
| 2009/0147909 A1 * | 6/2009 | Yoda | A61B 6/032 378/4 |
| 2009/0168951 A1 * | 7/2009 | Yan | A61B 6/588 378/8 |
| 2009/0180585 A1 * | 7/2009 | Fujimoto | A61B 6/032 378/115 |
| 2009/0252286 A1 * | 10/2009 | Mukumoto | A61B 6/032 378/11 |
| 2012/0114093 A1 * | 5/2012 | Yu | A61B 6/481 378/8 |
| 2012/0155605 A1 * | 6/2012 | Yazaki | A61B 6/032 378/8 |
| 2012/0183118 A1 * | 7/2012 | Halliburton | G16H 50/20 378/16 |
| 2013/0202079 A1 | 8/2013 | Yu | |
| 2013/0272500 A1 | 10/2013 | Kazama | |
| 2013/0308847 A1 * | 11/2013 | Schirra | G06T 7/0012 382/131 |
| 2014/0177788 A1 * | 6/2014 | Stevens | A61B 6/542 378/16 |
| 2014/0321603 A1 * | 10/2014 | Taguchi | A61B 6/405 378/5 |
| 2014/0328447 A1 * | 11/2014 | Koweek | A61B 6/50 378/4 |
| 2014/0376688 A1 * | 12/2014 | Karmazyn | A61B 6/542 378/8 |
| 2015/0190102 A1 * | 7/2015 | Bruno | A61B 6/542 378/39 |
| 2016/0000396 A1 * | 1/2016 | Taguchi | G06T 5/70 382/131 |
| 2016/0242712 A1 * | 8/2016 | Jin | A61B 6/5205 |
| 2016/0262714 A1 * | 9/2016 | Krauss | A61B 6/544 |
| 2017/0143291 A1 * | 5/2017 | Guntzer | A61B 6/032 |
| 2017/0143292 A1 * | 5/2017 | Yun | A61B 6/032 |
| 2017/0209105 A1 * | 7/2017 | Fan | A61B 6/544 |
| 2017/0319167 A1 * | 11/2017 | Goto | A61B 6/5211 |
| 2018/0040121 A1 * | 2/2018 | Lin | A61B 6/032 |
| 2019/0046232 A1 * | 2/2019 | Tokuda | A61B 34/20 |
| 2019/0150872 A1 * | 5/2019 | Crotty | A61B 6/465 |
| 2019/0231296 A1 * | 8/2019 | Jackson | A61B 6/488 |
| 2020/0121274 A1 * | 4/2020 | Hofmann | A61B 6/032 |
| 2020/0323496 A1 * | 10/2020 | Eibenberger | A61B 6/0487 |
| 2021/0045703 A1 * | 2/2021 | Crotty | H05G 1/36 |
| 2022/0130520 A1 * | 4/2022 | Xia | G16H 30/40 |

OTHER PUBLICATIONS

McNitt-Gray M. et al., "Tube Current Modulation Approaches: Overview, Practical Issues and Potential Pitfalls", AAPM Summit on CT Dose, 2011. Downloaded from https://www.aapm.org/meetings/2011CTS/documents/McNitt-GrayTubeCurrentModulationv4.pdf.

McCollough C.H. et al., "CT Dose Reduction and Dose Management Tools: Overview of Available Options", RADIOGRAPHICS, vol. 26, No. 2, pp. 503-513, 2006.

Deshpande H. et al., "Deep Learning Based Segmentation of Body Parts in CT Localizers and Application to Scan Planning", 2020 IEEE 17th International Symposium on Biomedical Imaging (ISBI), Iowa City, IA, USA, pp. 1130-1133, 2020.

Saalbach A. et al., "Automated Anatomy Detection in CT Localizer Images", 2015 IEEE 12th International Symposium on Biomedical Imaging (ISBI), Brooklyn, NY, USA, 2015, pp. 1151-1154.

Brosch T. et al., "Foveal Fully Convolutional Nets for Multi-Organ Segmentation", 2018 Proceedings vol. 10574, SPIE Medical Imaging 2018: Image Processing; 105740U, 2018. https://doi.org/10.1117/12.2293528.

* cited by examiner

SYSTEMS AND METHODS FOR PROCESSING AND VISUALIZING TUBE CURRENT MODULATIONS IN MEDICAL IMAGING DEVICES

FIELD

The following relates to the field of medical diagnostic imaging and, more specifically, to processing and visualization of x-ray tube current values.

BACKGROUND

Computer tomography (CT) scans are commonly performed on patients as part of medical examinations. A typical CT scan includes taking a plurality of x-ray images from different angles around a patient. The x-ray images are combined and processed to generate cross-sectional data of the scanned patient. In effect, a composite image is generated from a multitude of x-ray images.

However, further information, in addition to the x-ray image data, can be obtained from producing a CT scan and which may be useful in treating patients. Moreover, the further information can be presented in an intuitive and easily understood manner that avoids introducing frictions or inefficiencies in a medical practitioner's workflow.

SUMMARY

In one example, a computer-implemented method for visualizing tube current modulations includes accessing one or more x-ray tube current values for a portion of the patient scan, the one or more x-ray tube current values corresponding to x-ray tubes used to perform the portion of the patient scan, mapping the accessed one or more x-ray tube current values to an area of a scout scan associated with the patient scan, and applying a transformation function to the area of the scout scan to yield a transformed scout scan, the transformation function based on the accessed tube current values, wherein the area of the scout scan contrasts adjacent other areas of the scout scan when displayed to a user.

In some examples of the computer-implemented method, the transformation function includes a pixel color conversion of pixels of the scout scan to a new color corresponding to the accessed one or more x-ray tube current values.

In some examples of the computer-implemented method, the transformation function includes a saturation transformation function to modulate opacity of the new color.

In some examples of the computer-implemented method, the accessed tube current values are normalized.

In some examples of the computer-implemented method, the one or more x-ray tube current values are located in a metadata field of a Digital Imaging and Communication in Medicine (DICOM) header file.

In some examples of the computer-implemented method, the method further includes accessing a plurality of other patient scans related to the patient scan based on one or more of patient information or scanned anatomy, the plurality of other patient scans including other x-ray tube current values, identifying other x-ray tube current values that correspond to the one or more x-ray tube current values, the correspondence based on anatomical areas for which the other x-ray tube current values and the one or more x-ray tube current values were generate, and displaying the identified other x-ray tube current values to the user.

In some examples of the computer-implemented method, the method further includes generating one or more tube current fingerprints based on one or more of the x-ray tube current values or the identified other x-ray tube current values, each fingerprint including sequential colored line segments, each segment corresponding to an anatomical region and each color based on the x-ray tube current values or the identified other x-ray tube current values, and displaying the one or more tube current fingerprints to the user in a stacked formation, each of the fingerprints coaligned according to respective sequential colored line segments.

In some examples of the computer-implemented method, the method further includes determining an average x-ray tube current value for one of the anatomical areas based on the identified other x-ray tube current values, applying the transformation function to the determined average x-ray tube current value to yield a transformed value, and displaying the transformed value to the user in association with the one of the anatomical areas and displayed area of the scout scan.

In one example, a system for visualizing tube current modulations in a patient scan includes a medical diagnostic imaging device, a display communicatively coupled to the diagnostic imaging device, and a computing device configured to access one or more x-ray tube current values for a portion of the patient scan, the one or more x-ray tube current values corresponding to x-ray tubes of the medical diagnostic imaging device used to perform the portion of the patient scan, map the accessed one or more x-ray tube current values to an area of a scout scan associated with the patient scan, apply a transformation function to the area of the scout scan to yield a transformed scout scan, the transformation function based on the accessed tube current values, and display the transformed scout scan on the display, wherein the area of the scout scan contrasts adjacent other areas of the scout scan when displayed to a user.

In some examples of the system, the transformation function includes a pixel color conversion of pixels of the scout scan to a new color corresponding to the accessed one or more x-ray tube current values.

In some examples of the system, the transformation function includes a saturation transformation function to modulate opacity of the new color.

In some examples of the system, the computing device is further configured to normalize the accessed tube current values.

In some examples of the system, the one or more x-ray tube current values are located in a metadata field of a Digital Imaging and Communication in Medicine (DICOM) header file.

In some examples of the system, the computing device is further configured to access a plurality of other patient scans related to the patient scan based on one or more of patient information or scanned anatomy, the plurality of other patient scans including other x-ray tube current values, identify other x-ray tube current values that correspond to the one or more x-ray tube current values, the correspondence based on anatomical areas for which the other x-ray tube current values and the one or more x-ray tube current values were generated, and display the identified other x-ray tube current values to the user.

In some examples of the system, the computing device is further configured to generate one or more tube current fingerprints based on one or more of the x-ray tube current values or the identified other x-ray tube current values, each fingerprint including sequential colored line segments, each segment corresponding to an anatomical region and each color based on the x-ray tube current values or the identified other x-ray tube current values, and display the one or more tube current fingerprints to the user in a stacked formation, each of the fingerprints coaligned according to respective sequential colored line segments.

In some examples of the system, the computing device is further configured to determine an average x-ray tube current value for one of the anatomical areas based on the identified other x-ray tube current values, apply the transformation function to the determined average x-ray tube current value to yield a transformed value, and display the transformed value to the user in association with the one of the anatomical areas and displayed area of the scout scan.

In one example, a non-transitory computer readable medium stores instructions that, when executed by one or more processors, cause the one or more processors to access one or more x-ray tube current values for a portion of a patient scan, the one or more x-ray tube current values corresponding to x-ray tubes used to perform the portion of the patient scan and located in a metadata field of a Digital Imaging and Communication in Medicine (DICOM) header file, map the accessed one or more x-ray tube current values to an area of a scout scan associated with the patient scan, and apply a transformation function to the area of the scout scan to yield a transformed scout scan, the transformation function based on the accessed tube current values, the transformation function including a pixel color conversion of pixels of the scout scan to a new color corresponding to the accessed one or more x-ray tube current values and a saturation transformation function to modulate opacity of the new color, wherein the area of the scout scan contrasts adjacent other areas of the scout scan when displayed to a user.

In some examples of the non-transitory computer readable medium, the instructions further cause the one or more processors to access a plurality of other patient scans related to the patient scan based on one or more of patient information or scanned anatomy, the plurality of other patient scans including other x-ray tube current values, identify other x-ray tube current values that correspond to the one or more x-ray tube current values, the correspondence based on anatomical areas for which the other x-ray tube current values and the one or more x-ray tube current values were generated, and display the identified other x-ray tube current values to the user.

In some examples of the non-transitory computer readable medium, the instructions further cause the one or more processors to generate one or more tube current fingerprints based on one or more of the x-ray tube current values or the identified other x-ray tube current values, each fingerprint including sequential colored line segments, each segment corresponding to an anatomical region and each color based on the x-ray tube current values or the identified other x-ray tube current values, and display the one or more tube current fingerprints to the user in a stacked formation, each of the fingerprints coaligned according to respective sequential colored line segments.

In some examples of the non-transitory computer readable medium, the instructions further cause the one or more processors to determine an average x-ray tube current value for one of the anatomical areas based on the identified other x-ray tube current values, apply the transformation function to the determined average x-ray tube current value to yield a transformed value, and display the transformed value to the user in association with the one of the anatomical areas and displayed area of the scout scan.

DETAILED DESCRIPTION

Figure 1:
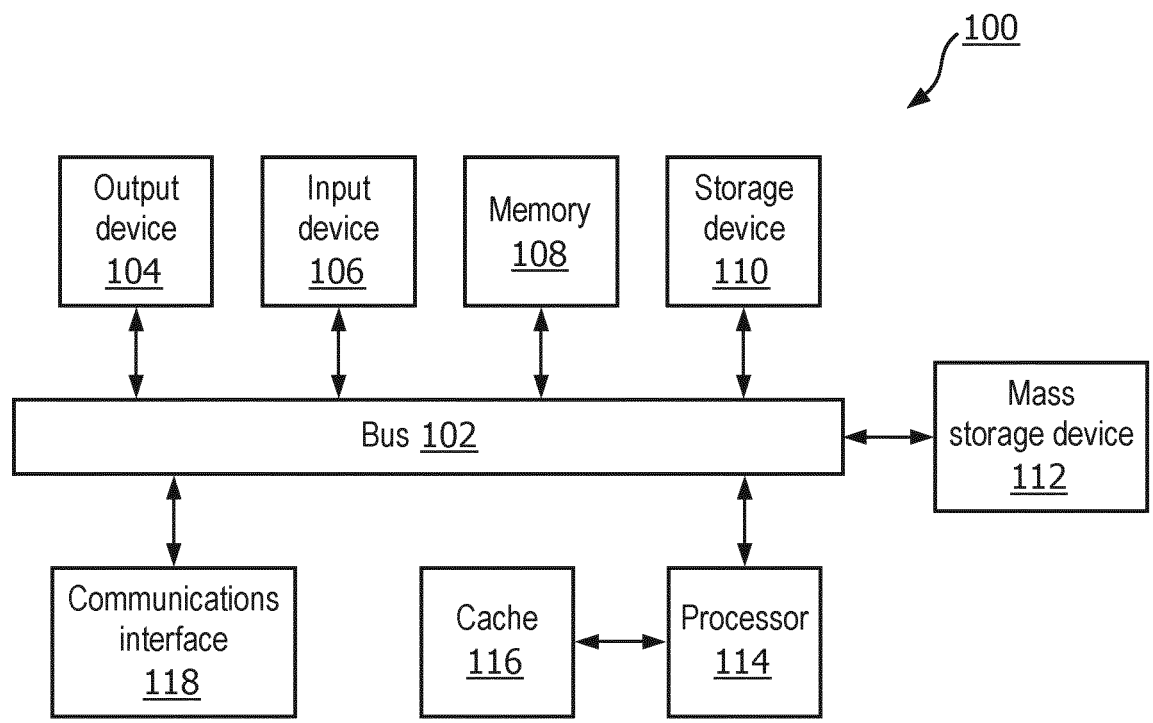
FIG. 1 is a system diagram depicting an example of a computer system, in accordance with some embodiments of the subject technology.

CT scans are generated by taking multiple x-ray images close to, or at, the same time as each other. The x-ray images are then used to generate tomography data, via computer algorithm, to produce composite images of sections of the scanned patient. In many examples, the x-rays producing the x-ray images are set at multiple, varying angles to the patient. Nevertheless, x-ray tubes are typically used to generate the x-rays and x-ray images.

A standard x-ray tube converts electrical energy into x-rays (e.g., via an anode, etc.). The electrical energy is provided to the tube in the form of a current and the produced x-ray is proportional to the current fed to the x-ray tube. Conversely, the tube current is proportional to the number of x-ray photons generated, also referred to as the photon flux. However, while signal to noise ratio (SNR) increases alongside higher photon flux, the correlation is not strictly proportional.

In many x-ray scanners, the current, or tube current, can be modulated in order to adjust the produced x-ray. Often, the tube current is modified in order to maintain a consistent signal to SNR throughout the scanning process. In particular, as different volumes of dense tissue (e.g., muscle, fat, bone, etc.) are x-rayed, different tube currents may result in different SNRs. As a result, the tube current can be modulated in response to x-raying different organs, parts of the body, etc.

In some examples, tube current modulation is performed automatically (e.g., in response to monitoring the SNR in real time throughout the CT scan process, etc.). For example, the tube current can be modulated based on the amount and density of tissue to be penetrated by the resultant x-ray. A scan of the lungs and abdomen of a patient may include reducing the z-portion of the scan where it progresses over the lungs and increasing the same portion of the scan where it progresses over the abdominal area. Further, the applied tube current for each cross-sectional slice (e.g., x-ray image)

of the CT scan can be stored in a corresponding Digital Imaging and Communications in Medicine (DICOM) file, which is typically produced and associated with each cross-sectional slice.

Some CT scanner vendors provide tube current data for validation of scanner settings and functions. In some examples, the provided tube current data may be displayed to end users as a graph overlaid on a scout scan image. However, such representation occludes portions of the scout scan image and can make it difficult to visually assess local tube current values at the level of individual pixels or groups of pixels. Further, detailed estimation of organ location and extent is often difficult to determine due to various factors, such as, for example, the superposition of organs with different absorption characteristics. In effect, what displayed information regarding tube current modulation that can be determined often requires a reader to match and decompose the displayed information in order to understand the relation between anatomical regions and characteristics of the applied modulation, thus taking time and focus away from medically interpreting a reading. Disclosed is a solution to the technical problem of determining and the relationship between tube current modulations and respective anatomical regions and displaying said determinations in an intuitive and efficient manner that enables users to maintain focus on more relevant tasks, such as medical interpretation of a scan.

In particular, tube currents can be determined and converted to color codes. The color codes can then be used to convert a gray scale scout scan image to a colorized version (e.g., RGB) corresponding to the tube current values. As a result, clinicians may quickly determine approximate tube current values and tube current value modulations throughout the scanning process by appraising the colorized scout scan image. Visual clutter is reduced and the risk of occluding graphical user interface (GUI) elements obstructing features of the scout scan image is averted.

Moreover, tube current modulation information can be associated with particular anatomical regions of interest, such as, for example and without imputing limitation, lungs, abdomen, pelvis, etc. In some examples, the associated information may be gathered and derived values, such as, for example and without imputing limitation, average, minimum, and/or maximum tube current, may be calculated per region of interest. Location and extent of anatomical regions can be estimated using image segmentation algorithms and/or region of interest regression techniques well known in the art on scout scans and/or CT images.

In some cases, the axial extent of the scout image may be different than the axial extent of the reconstructed 3D CT image (for which the DICOM slices are exported from the scanner). As a result, the extent of the color overlay may not perfectly coincide with the underlying image. This difference can be either positive, where the CT-volume axial extent is smaller than the axial extent of scout image, or negative, where the scout image axial extent is smaller than the axial extent of the CT-volume, and so overlaps may be different at each end (e.g., top and/or bottom) of the axial image extent.

In order to account for mismatched axial extents, the tube current modulation information may be overlaid across only a portion of the vertical extent of the image. Further, in some examples and without imputing limitation, a horizontal bar (relative to the axial extent) may be aligned with the axial positioning of the 3D CT scout image and display a color bar with a representation of the tube current modulation.

A variety of visualization and evaluation techniques can be applied using the gathered and derived value of the tube current modulation to generate informative overlays, in addition to, or instead of, color coded bands. For example, tabular, plot, and overlay graphical elements may be added to an image of a scan.

Quantitative representations of statistical properties (e.g., minimum, maximum, mean, median, etc.) of the tube current modulation for an anatomical region of interest can be displayed to a user as a table (e.g., alongside a scan output image, etc.). The table may include information related to patient history (longitudinal) or larger patient populations (global) for comparison to the current scan to, for example and without imputing limitation, identify drift warning where a significant difference from the longitudinal or global values is detected in the current patient values. Statistical plots may be provided in the form of boxplots, for example, to visualize the tube current modulation per region of interest. Additional overlays, such as the color overlay described above, may be combined with the tabular and/or box plot displays to provide rapid assessment of a scan in one display. In some examples, ensembles of exams can include one or more of the above visualizations and be aligned by anatomy to provide an easily comparable view of multiple exams.

A discussion of certain example embodiments of the subject technologies follows. While architectures, systems, methods, and/or apparatuses are disclosed, a person having ordinary skill in the art will understand these to be examples for general understanding and clarity. Accordingly, variations on the disclosed embodiments, such as more or fewer steps, alternative architectures, and other variations may yet still fall within the spirit and scope of the disclosure.

FIG. 1 is an example computing system 100 that may implement various systems and methods discussed herein. The computer system 100 includes one or more computing components in communication via a bus 102. In one implementation, the computing system 100 includes one or more processors 114. The processor 114 can include one or more internal levels of cache 116 and a bus controller or bus interface unit to direct interaction with the bus 102. The processor 114 may specifically implement the various methods discussed herein. Main memory 108 may include one or more memory cards and a control circuit (not depicted), or other forms of removable memory, and may store various software applications including computer executable instructions, that when run on the processor 114, implement the methods and systems set out herein. Other forms of memory, such as a storage device 110 and a mass storage device 112, may also be included and accessible, by the processor (or processors) 114 via the bus 102. The storage device 110 and mass storage device 112 can each contain any or all of the methods and systems discussed herein.

The computer system 100 can further include a communications interface 118 by way of which the computer system 100 can connect to networks and receive data useful in executing the methods and system set out herein as well as transmitting information to other devices. The computer system 100 can also include an input device 106 by which information is input. Input device 106 can be a scanner, keyboard, and/or other input devices as will be apparent to a person of ordinary skill in the art. The computer system 100 can also include an output device 104 by which information can be output. Output device 104 can be a monitor, printer, USB, and/or other output devices or ports as will be apparent to a person of ordinary skill in the art.

The system set forth in FIG. 1 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the methods can be rearranged while remaining within the disclosed subject matter. The accompanying method claims present elements of the various steps in a sample order and are not necessarily meant to be limited to the specific order or hierarchy presented.

The described disclosure may be provided as a computer program product, or software, that may include a computer-readable storage medium having stored thereon instructions, which may be used to program a computer system (or other electronic devices) to perform a process according to the present disclosure. A computer-readable storage medium includes any mechanism for storing information in a form (e.g., software, processing application) readable by a computer. The computer-readable storage medium may include, but is not limited to, optical storage medium (e.g., CD-ROM), magneto-optical storage medium, read only memory (ROM), random access memory (RAM), erasable programmable memory (e.g., EPROM and EEPROM), flash memory, or other types of medium suitable for storing electronic instructions.

Figure 2A:
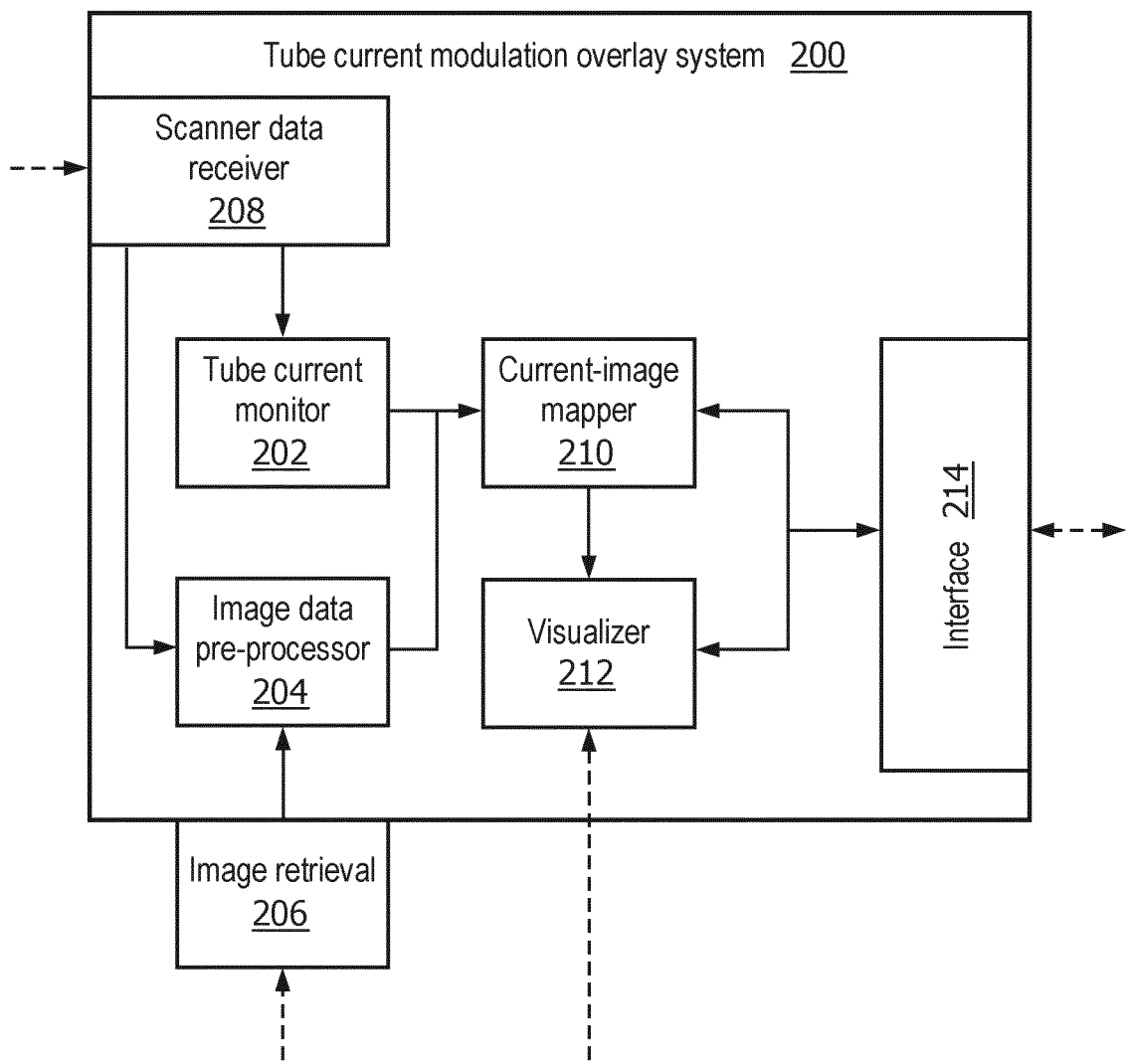
FIG. 2A is a system diagram depicting an example of a tube current modulation overlay system, in accordance with some embodiments of the subject technology.

FIG. 2A depicts an example of a tube current modulation overlay system 200. While the tube current modulation overlay system 200 is depicted as a unitary system, it will be appreciated that this is for purposes of explanation only and that the tube current modulation overlay system 200 may be deployed as a monolithic architecture, disaggregated architecture, cloud service, and various other deployment structures as will be apparent to a person having ordinary skill in the art.

Nevertheless, the tube current modulation overlay system 200 includes various interfaces for interacting with external systems, including a scanner data receiver 208, an image retrieval 206, and an interface 214. The scanner data receiver 208 receives scanner information in the form of image data, as individual image files or image file stacks of slices, from a medical diagnostic device. In one example, the medical diagnostic device is a CT scanner and the scanner data receiver 208 is configured to receive image data from the CT scanner in the form of DICOM files. In some examples, the scanner data receiver 208 is directly connected to a respective medical diagnostic device. In some examples, the scanner data receiver 208 may intercept, or otherwise receive, DICOM files transmitted over a hospital network.

The scanner data receiver 208 provides tube current values to a tube current monitor 202. DICOM files include tube current values in the metadata of each respective file header and may be extracted with, for example, a packet parser. A tube current monitor 202 receives and tracks the extracted tube current values from the scanner data receiver 208. The tube current monitor 202 also receives tracking values included in the DICOM header, such as "slice location," "image position," "image orientation," and/or "pixel spacing." For example, slice location may contain values defined as a relative position of an image plane and stored as "(0020,1401)," the image position may include a patient identifier and z-, y-, and z-axis coordinate values (e.g., using the center of the first voxel transmitted as an upper left hand reference point), image orientation may include direction cosines of the first row and first column with respect to the patient, and pixel spacing may provide the physical distance between neighboring pixels. Generally, special values may be defined in millimeters.

The scanner data receiver 208 can process the DICOM files using a parser as is known in the art to identify various fields and corresponding values. The pydicom Python package is one such example, though multiple alternative DICOM parsers may be used in processing the DICOM files.

In some examples, the tube current monitor 202 may normalize the tube current values to a specified range. The normalized values may then be used by a current-image mapper 210 to transform a corresponding scout scan color values to represent the tube current. The current-image mapper 210 applies a color scale, based on the normalized tube current values, to the corresponding scout scan. In some examples, the color scale is set by a user through an interface 214, and may be customized to user preference, clinical context, patient history, etc. While any color scale may be used, the scale ranging from blue to red is provided in this disclosure for explanatory purposes only. Other color scales may include a range from green to red, green to yellow, yellow to red, and so on.

An image data pre-processor 204 may receive image data files from the scanner data receiver 204 and/or an image retrieval 206. Image retrieval 206 may include an integration for a Picture Archiving and Communications System (PACS). Images for a patient, such as the scout scan, may be retrieved from the image retrieval 206 to be prepared by the image data pre-processor 204. In some examples, the image data pre-processor 204 may add metadata or modify the image file of the retrieved scout scan to enable the current-image mapper 210 to apply color transformations.

In some examples, additional, or alternative, values can be generated by the image data-preprocessor 204 through either or both of extraction from DICOM header metadata or calculated derivations on image or metadata. For example, "exposure," "dose saving," and/or "CTDI_vol" can be extracted from the DICOM header metadata and provided to the current-image mapper 210 for correlation of the values to the scout scan. Exposure is the product of the tube current in milliamperes (mA) and corresponding exposure time is provided in seconds. Dose saving is a percentage of dose saved due to a corresponding applied tube current modulation, as compared to a scan acquired with maximum tube current. CTDI_vol is a volumetric dose index, which is a standardized measure of radiation dose output of a CT scanner. Likewise, the image data-preprocessor 204 may compute values such as "water equivalent diameter" from the image content of the DICOM file using, for example and without imputing limitation, image processing algorithms and/or trained classifiers. The computed values may likewise be provided to the current-image mapper 210 for correlation to the scout scan.

A visualizer 212 compiles the mapped tube current information from the current-image mapper 210 and generates graphical content for display to the user via the interface 214. Users can configure particular visualization settings of the visualizer 212, such as threshold values, color scales, which data is visualized, etc., by interacting with the interface 214. Moreover, in some examples, the visualizer 212 may receive various statistical or other global information from a statistics engine or database, further discussed below in reference to FIG. 2C. This additional information can be integrated into visual elements prepared by the visualizer 212 and provided to the user via the interface 214.

Figure 2B:
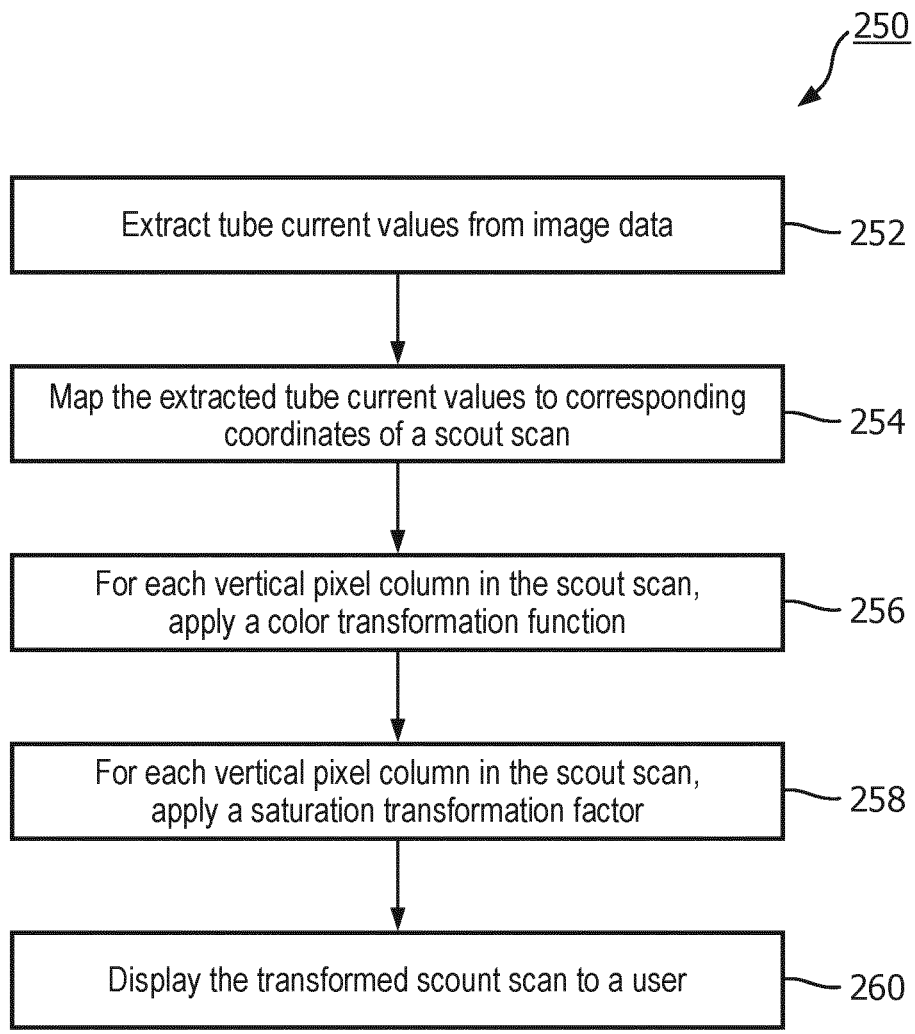
FIG. 2B is a flowchart depicting an example of a method for generating a tube current modulation view, in accordance with some embodiments of the subject technology.

FIG. 2B depicts a method 250 for generating and visualizing mapped tube current values from, for example and without imputing limitation, a CT scan. Method 250 can be performed by one or more processors executing stored instructions and/or on a system, such as the one depicted in FIG. 2A and discussed above. Nevertheless, it will be understood that method 250 is provided for purposes of explanation and understanding, and steps depicted in method 250 may be modified, replaced, or added to without departing from the spirit and scope of this disclosure.

At step 252, tube current values are extracted from image data. In some examples, the image data is received by the scanner data receiver 208 described above in reference to FIG. 2A. The tube current values include x-ray current values for one slice, or image, of a CT scan. Where the image is provided as part of a DICOM file, the tube current values can be extracted from metadata in a header portion of the DICOM file.

At step 254, the extracted tube current values are mapped to corresponding coordinates of a scout scan. Mapping the extracted tube current values may be done using coordinate information in the DICOM header file indicating slice location, image position, image orientation, and pixel spacing. The scout scan may be retrieved from a networked PACS through, for example, the image retrieval 206.

The scout scan can then be copied to each channel a multichannel image. For example, where an RGB image is used, the scout scan is copied to each of the three channels of the RGB image. This enables an RGB image of the scout scan to be color modified along each respective primary color channel (e.g., red, green, and blue, etc.). Further, the tube current values may be normalized and, in one example, the tube current values are normalized to a range of −1 to 1.

At step 256, a color transformation function is applied to each vertical pixel column in the scout scan. In some examples, a color scale may be selected from a variety of options by a user, or entered by the user, through the interface 214. For example, a minimal tube current value may be mapped to "blue" and a maximal tube current value may be mapped to "red". Using the normalized tube current values, Mapping Function 1 below can be applied to each vertical pixel column to achieve a scout scan image color mapped to the tube current values.

For $TC\_n(z) < 0$: $R(z) =$  Mapping Function (1)

$$(1 + TC\_n(z)) * R(z); G(z) = (1 + TC\_n(z)) * G(z)$$

For $TC\_n(z) > 0$: $R(z) = (1 - TC\_n(z)) * R(z); B(z) = (1 - TC\_n(z)) * B(z)$

In Mapping Function 1, $TC\_n(z)$ represents the tube current value mapped to a z-coordinate of the scout scan and normalized to a span ranging from −1 to 1. $R(z)$, $G(z)$, and $B(z)$ respectively represent red, green, and blue channel pixel values at the corresponding z-coordinate within the RGB image of the scout scan. Effectively, Mapping Function 1 proportionally modifies the red and green channels of pixels at coordinates of the RGB scout scan image where the corresponding normalized tube current value is more than 0. Where the corresponding normalized tube current value is less than 0, Mapping Function 1 instead proportionally modifies the red and blue channels of the pixels at the respective coordinates. The resulting RGB scout scan image will thus be colorized according to a scale tightly coupled to, and representative of, the tube current values for imaging corresponding locations by a corresponding CT scan.

At step 258, a saturation transformation factor is applied to each vertical pixel column in the scout scan. The saturation transformation factor, an example of which is shown in integrated form in Mapping Function 2 below, ensures that color saturation does not overwhelm the underlying scout scan image and effectively make the features and image textures unreadable. In effect, the saturation transformation factor softens the colorization of the image.

For $TC\_n(z) < 0$: $R(z) =$  Mapping Function (2)

$$(1 + s * TC\_n(z)) * R(z); G(z) = (1 + s * TC\_n(z)) * G(z)$$

For $TC\_n(z) > 0$: $R(z) = (1 - s * TC\_n(z)) * R(z); B(z) = (1 - s * TC\_n(z)) * B(z)$

Mapping Function 2 integrates the saturation transformation factor and may be used in lieu of the Mapping Function 1. In Mapping Function 2, the additional saturation factor is represented by s and is applied directly to the normalized tube current values to generate modified RGB values. In general, the saturation factor s is a value 0 and 1. With the saturation function applied, a transformed scout scan image having three color channels mapped to the tube current values, an example of which is depicted in FIG. 3A discussed below, can be displayed.

At step 260, the transformed scout scan is displayed to a user for review. In some examples, the displayed transformed scout scan provides to the user a colorized view of the scanned patient. The colorized view may include bands of colors, corresponding to the tube current values recorded at respective anatomical regions of the scan, overlaid on the scout scan so as not to obfuscate the underlying features of the scan while still providing detailed tube current information. In some examples, users may be able to switch between the colorized view and a traditional view 350, such as that depicted in FIG. 3B.

Figure 3A:
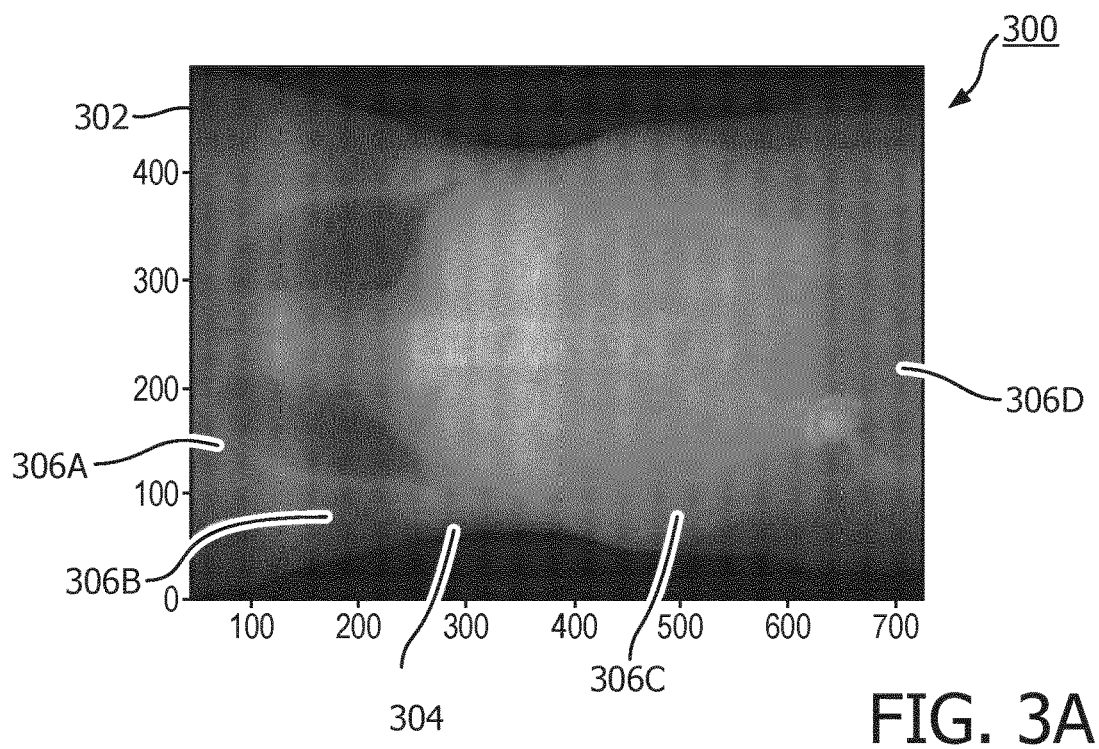
FIG. 3A is an example view of a tube current modulation overlay, in accordance with some embodiments of the subject technology.
Figure 3B:
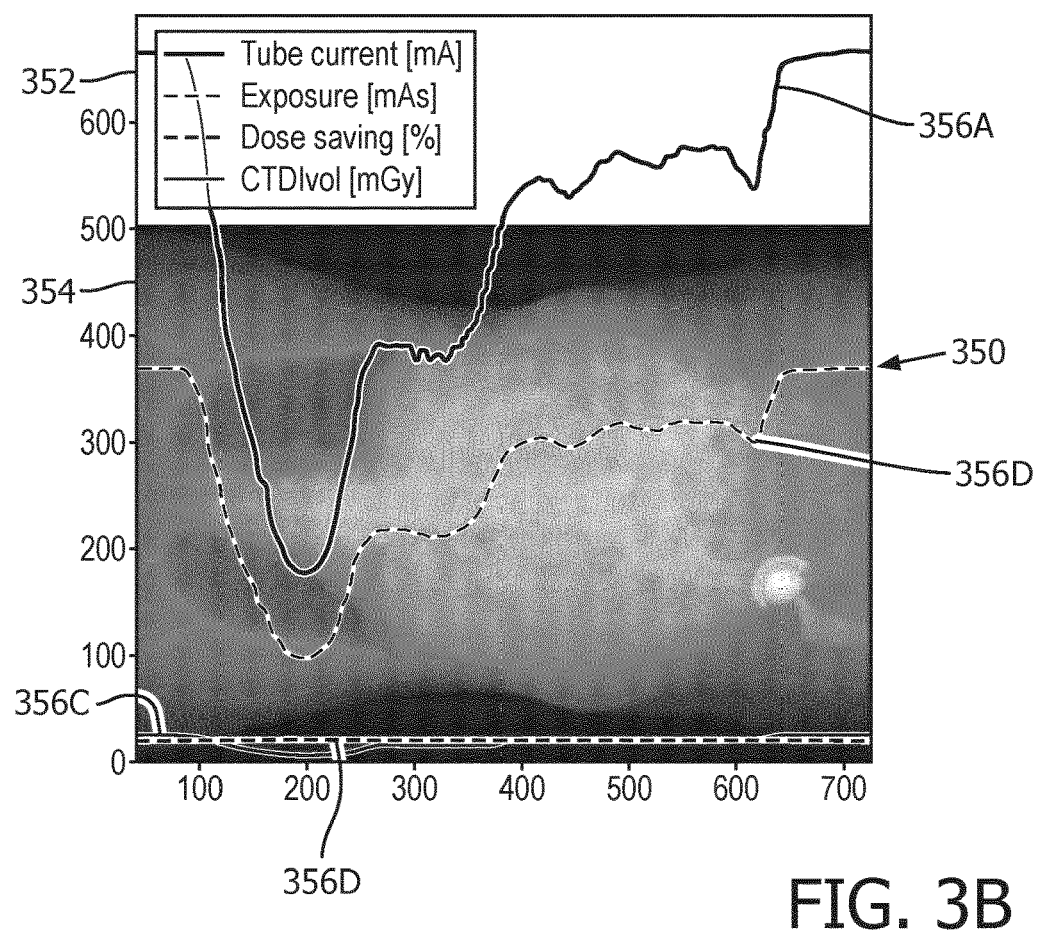
FIG. 3B is an example view of a tube current modulation overlay, in accordance with some embodiments of the subject technology.

FIGS. 3A and 3B respectively depict a colorized view 300, such as that produced by method 250 above, and the traditional view 350, upon which the colorized view 300 improves by providing, among other features, non-obstructive views of tube current values mapped to corresponding anatomical regions. In particular, the traditional view 350 includes a 2D image 354 (e.g., a scout scan, etc.) overlaid with a series of graph lines 356A-D corresponding to various relevant values from a scan. Additionally, a legend 352 further consumes available viewing space. Here, the graph line 356A charts tube current values along the longitudinal axis of the scan and corresponding to regions of the scan over which the graph is overlaid. Likewise, the graph lines 356B-D respectively chart exposure, dose savings, and a CT dose index (CTDI_vol), and are directly overlaid upon the scan.

In contrast, the colorized view 300 depicted by FIG. 3A shows some of the improvements of the disclosure over the traditional view 350. In particular, the colorized view 300 includes a scout scan image 302, which provides a longitudinal scan 304 of a patient being examined by CT scanner. Color bands 306A-D are unobtrusively overlaid on the longitudinal scan 304 of the patient. Each color band 306A-D is generated according to a mapping of tube current values to RGB channel values, such as, for example, by the method 250 described above.

As depicted in FIG. 3A, the color bands 306A-D are mapped such that blue corresponds to a minimal tube current value and red corresponds to a maximal tube current value. The mapped colors are scaled linearly. The aforementioned mapping will be understood to be one example and that other mappings and scales may be used without departing from the spirit and scope of this disclosure.

Here, each color band 306A-D clearly corresponds to anatomical areas and modulations to the tube current can be seen over the areas as a whole. The red color band 306A shows a maximal tube current value at the top of a lung region, and the blue color band 306B shows a drastic shift to minimal tube current values in majority portion of the lung region.

In comparison, the red color bands 306C and 306D show a stepping up of the tube current values back to a maximal values as the scan progresses from the lung region to an abdominal region and then pelvic region respectively. The visualizations may be used, for example, by a medical physicist responsible for dose monitoring and in assessing performance and functionality of tube current modulations in a scan. As another example, where a dose is higher than expected for a given exam type (e.g., a dose alert), the medical physicist may rapidly perform a visual check to identify where the high dose values occurred in respect to the patient anatomy.

Figure 2C:
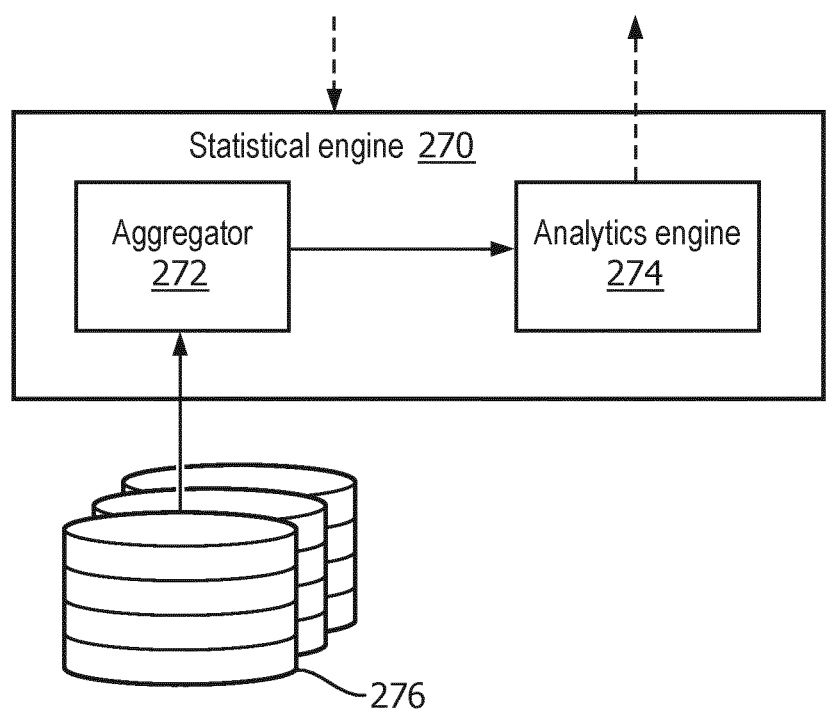
FIG. 2C is a system diagram depicting an example of a tube current values statistical engine, in accordance with some embodiments of the subject technology.

In some examples, the tube current modulation overlay system 200 may supplement overlay information with a statistical engine 270 to generate further information related to tube current modulations for a particular patient over multiple exams or relative to population-level values. The statistical engine 270 depicted in FIG. 2C is one such example. The statistical engine 270 may be incorporated directly into the tube current modulation overlay system 200 or, in some examples, may be made accessible to the tube current modulation overlay system 200 as a microservice or the like. Different visualization and evaluation techniques can be implemented based on the assessment being consider. For example, a tabular format may be displayed to provide a quantitative representation of statistical properties (e.g., min, max, mean, median, etc.) of the tube current modulation for the anatomical regions of interest. Visualization of the tube current modulation per region of interest may also or instead be displayed as statistical plots (e.g., boxplots visualizing distribution parameters for individual organs, such as the lungs, etc.). In addition, overlays combining visualizations of the scout together with curves or color coding can facilitate advanced visualization taking the anatomies into account (e.g., by providing anatomical landmarks in the scout and curves indicating region boundaries or interactive visualization allowing for visualization of anatomy specific curves only).

The statistical engine 270 includes an aggregator 272 and an analytics engine 274. The aggregator 272 is able to access patient history (e.g., via electronic medical record (EMR), etc.) and the hospital PACS, for example as a networked repository 276, to retrieve either or both earlier scans of the patient and/or scans of other patients. The aggregated information may then be used to generate time-series and population comparison data, which may be provided to the user as additional overlays, such as those depicted in FIGS. 5A-B further discussed blow.

The statistical engine 270 may determine statistical properties (e.g., minima, maxima, mean, median, etc.) of tube current modulations for an anatomical regions of interest relative to a larger population or relative to all, or some portion of, recorded scans of the patient. In some examples, the statistical engine 270 can additionally automatically detect if a scan drifts significantly away from the determined statistical properties and trigger an alert for the user to check for potential defects in the scan and/or scan procedure.

Figure 4:
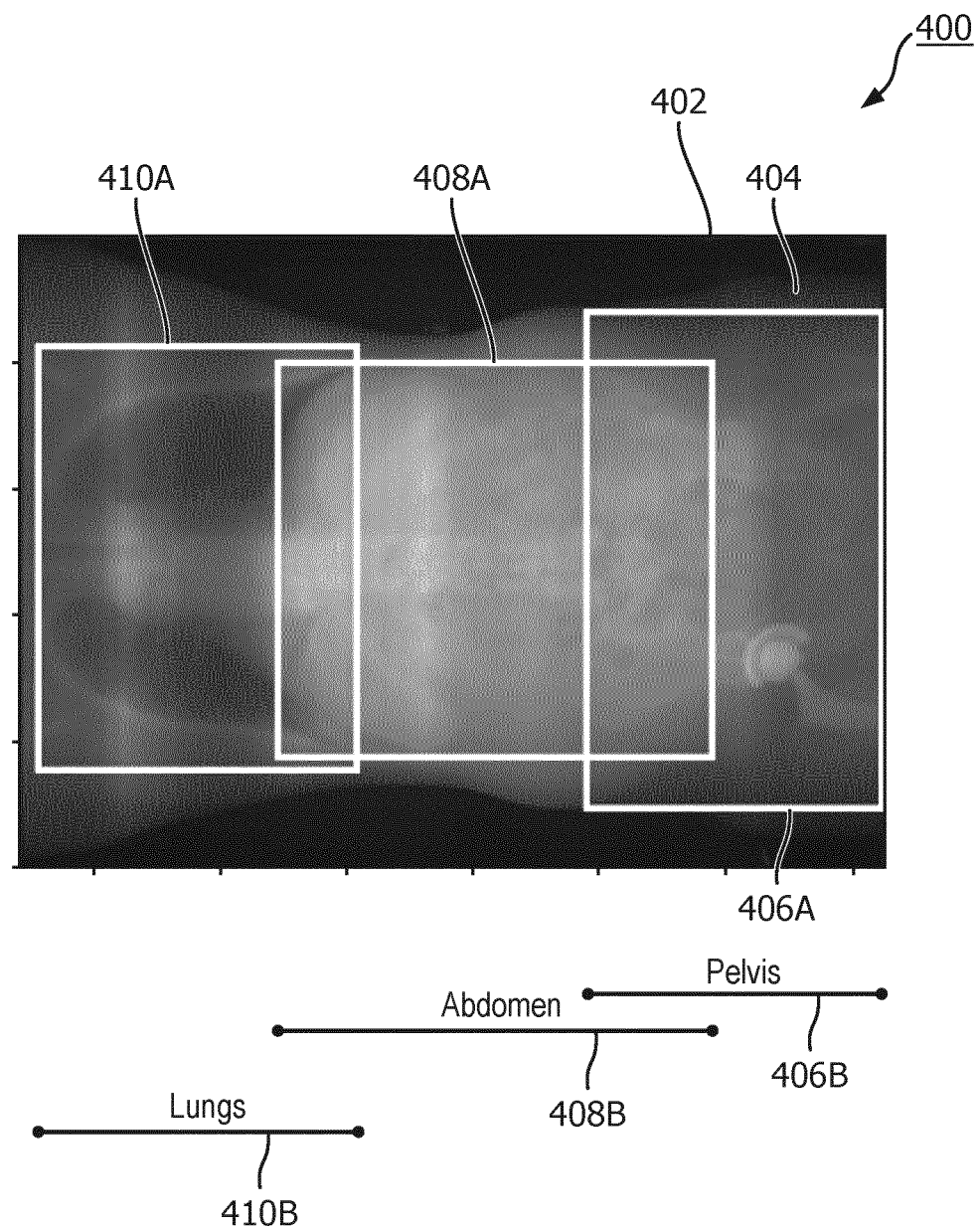
FIG. 4 is an example view of a tube current modulation overlay including anatomy identification, in accordance with some embodiments of the subject technology.

Moreover, the visualizer 212 may use the determined statistical properties to display the tube current modulation values for regions of interest in terms of statistical plots. For example, and as depicted in FIG. 4 further discussed below, boxplots may be used to visualize distribution parameters for individual organs or regions, such as lungs, pelvis, abdomen, etc.

The visualizer 212 may integrate the data generated by the statistical engine 270 into the overlay. For example, the visualizer may take anatomies into account by providing anatomical landmarks in the scout scan image and curves indicating region boundaries or interactive visualization allowing for visualization of anatomy specific curves only. In effect, the tube current modulation information can be aligned anatomically across multiple exams based on landmarks and so compensate for anatomical and/or imaging parameter (e.g., field of view (FOV), etc.) variances.

Figure 2D:
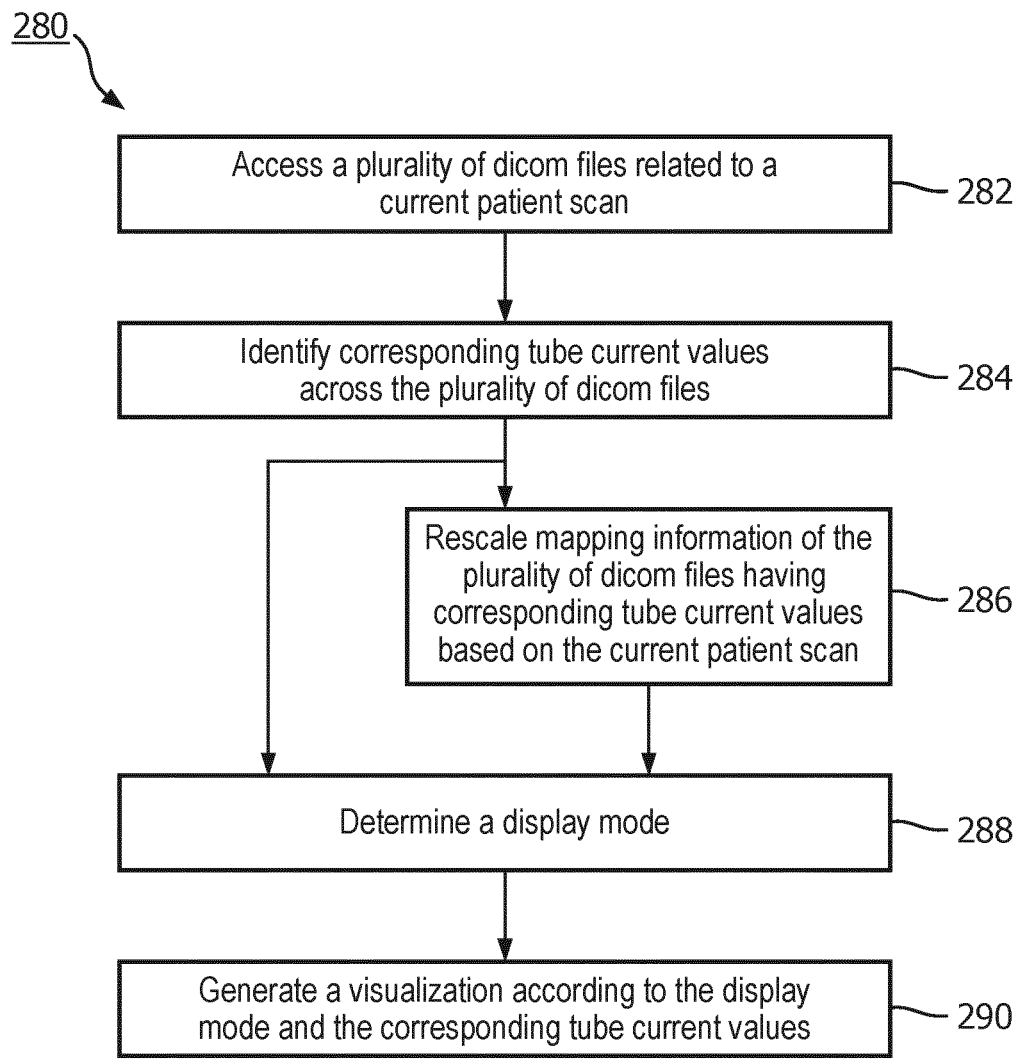
FIG. 2D is a flowchart depicting an example of a method for generating contextual tube current modulation views, in accordance with some embodiments of the subject technology.

FIG. 2D depicts an example of a method 280 for generating enriched tube current modulation visualizations. Method 280 can be performed by one or more processors executing stored instructions and/or on a system, such as the one depicted in FIG. 2C and discussed above. Nevertheless, it will be understood that method 280 is provided for purposes of explanation and understanding, and steps depicted in method 280 may be modified, replaced, or added to without departing from the spirit and scope of this disclosure.

At step 282, a plurality of DICOM files related to a current patient scan are accessed. The DICOM files may be related to the patient, such as in the case of retrieving previous scans of the same patient, or may be related to the scan of the patient, such as in the case of retrieving DICOM files for scans of the same anatomical regions from other patients. The DICOM files may include one or more images, or slices, stored in stacks and the slices include tags in the form of metadata fields.

At step 284, corresponding tube current values across the plurality of DICOM files are identified. In one example, the DICOM tags of the DICOM files are checked to ensure the corresponding scan was done over the same anatomical areas as the current patient scan. Where the scanned anatomical areas match, the respective tube current values can be retrieved from the DICOM tags.

Method 280 may proceed from step 284 to step 288 or step 286 based on the usage of the data. For example, where the user is visually reviewing the corresponding tube current values to compare many values at once, method 280 proceeds to step 286 to modify and/or normalize the data for ease of comparison. In other examples, the user may intend a numerical review, in which case the data may be provided in unmodified form and method 280 may proceed directly to step 280.

Figure 5A:
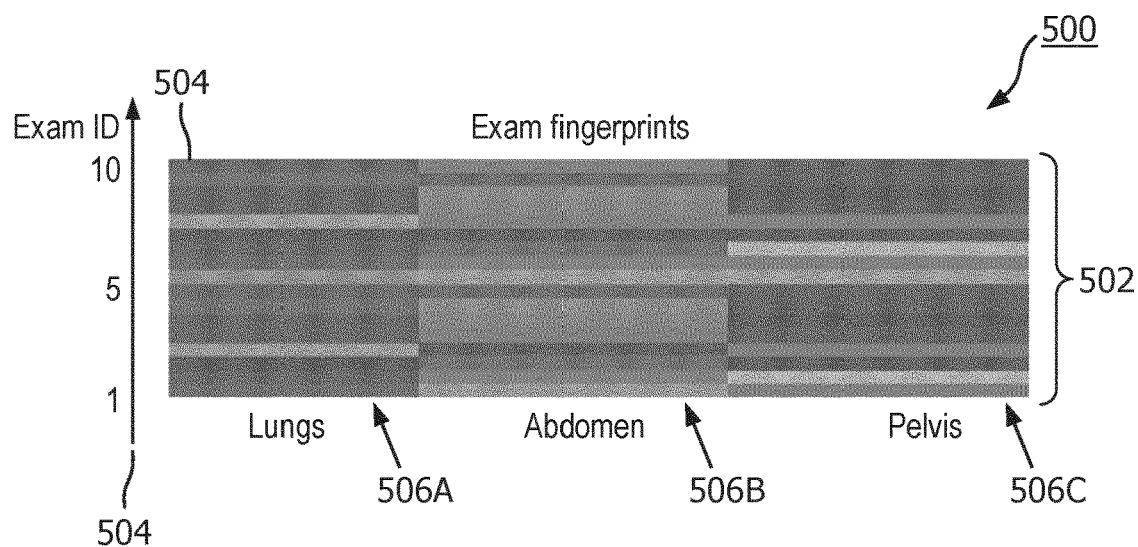
FIG. 5A is an example view of a stacked tube current modulation display, in accordance with some embodiments of the subject technology.

Nevertheless, at step 286, mapping information of the plurality of DICOM files having corresponding tube current values are rescaled based on the current patient scan. For example, the axial extent of the scout image of the current patient scan may be different to the axial extent of respective reconstructed 3D CT images of the accessed DICOM slices. As a result, the extent of a color overlay for an accessed DICOM slice may not perfectly coincide with the color overlay for the scout scan (as described above). The difference can be either positive, where a CT-volume axial extent is smaller than that for the scout image, or negative, where the scout image axial extent is smaller than that of the CT-volume, and/or overlaps may be different at each end (e.g., top or bottom) of the axial extent of the scout image. Accordingly, the tube current modulation information may be rescaled to fit, for example, a horizontal bar aligned with the axial positioning of the scout image and displaying a color bar with a representation of the tube current modulation, as depicted in FIG. 5A further discussed below.

At step 288, a display mode is determined. The display mode may be selected by the user through a GUI, such as interface 214 discussed above, determined by a user setting, determined automatically based on the scan being undergone by the patient, predicted based on characteristics of the user and/or patient, or be determined by various other mechanisms.

At step 292, a visualization is generated according to the display mode and corresponding tube current values. The visualization may be generated by the visualizer 212 and may be provide additional interactable options to the user, such as options to change the display mode, filter displayed results, perform additional searches and/or comparisons, etc. For example, the user may be able to alternate between views 400, 500, and 550, respectively depicted in FIGS. 4 and 5A-B discussed below.

FIG. 4 depicts a box plot view 400 of a colorized scout scan that has been supplemented with information from the statistics engine 270. In the box plot view 400, anatomy detection is visualized and overlaid on a scout scan colorized based on tube current values as described above. Colorized tube current values are provided adjacent to the scout scan to provide users with intuitive and comparable information to, for example, assist the user in identifying unusual or concerning tube current values on the scout scan.

The box plot view 400 includes a colorized scout scan 402. Overlaid on the colorized scout scan 402 are anatomy boxes 406A, 408A, and 410A. Anatomy box 406A indicates an area of the scout scan 402 corresponding to the lungs. Anatomy box 408A indicates an area of the scout scan 402 corresponding to the abdomen. Anatomy box 410A indicates an area of the scout scan 402 corresponding to the pelvis.

Further, colorized average tube current value bars 406B, 408B, and 410B are set below the scout scan 402 and in vertical alignment with the anatomy boxes 406A, 408A, and 410A. The colorized average tube current value bars 406B, 408B, and 410B are color mapped according to the same mapping function as the scout scan 402 and represent the average tube current for the corresponding anatomical region across multiple DICOM files. Here, the lungs colorized average tube current value bar 410B is blue, while the abdomen colorized average tube current value bar 408B and pelvis colorized average tube current value bar 410B are light red and dark red, respectively. In effect, the user can quickly compare color bands of the scout scan 402 to a corresponding regional colorized average tube current value bar to determine whether the tube current values of the patient scan are within acceptable range of average or not.

FIG. 5A depicts a stacked view 500 of multiple exams which displays variations of tube current values across the multiple exams for the same anatomical regions using stacked "fingerprints." Alignment of each exam can be performed as per step 286 described above. The stacked view 500 allows for users to quickly spot outlier values.

The stacked view 500 includes an exam stack 502, which is made of a plurality of exam fingerprints 504. Each exam fingerprint 504 is a horizontally distributed line segment characterized by rescaled anatomical sections colorized according to respective tube current values at the time of examination. Here, each exam fingerprint 504 includes a lungs section 506A, abdomen section 506B, and pelvis section 506C. An exam ID axis 504 provides associated identifiers for each exam fingerprint 504. In some examples, by interacting with identifiers in the exam ID axis 504, users can navigate to the corresponding original exam file and/or access the DICOM file(s) to review the respective information unmodified for the stack view 500.

Figure 5B:
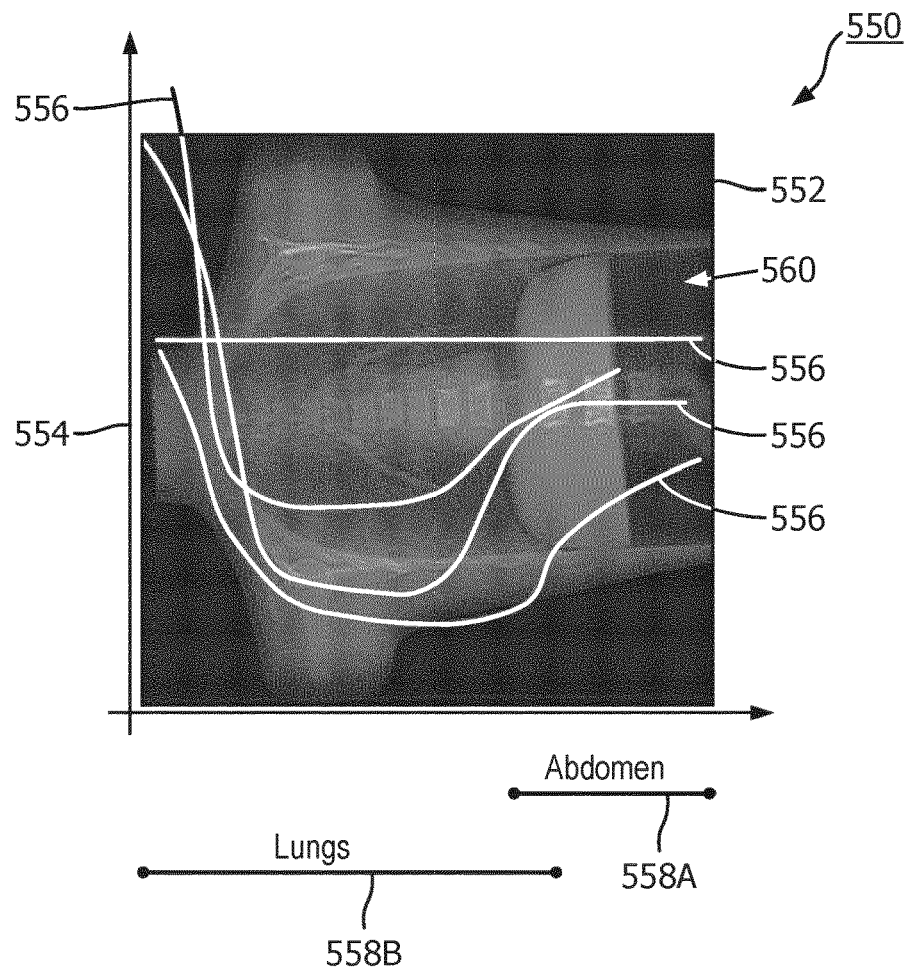
FIG. 5B is an example view of a comparative tube current modulation display, in accordance with some embodiments of the subject technology.

FIG. 5B depicts a patient context view 550 for comparing tube current modulation values of a current patient's current scan to either other patients (e.g., an inter-patient comparison) or to earlier scans of the current patient (e.g., an intra-patient comparison). The patient context view 550 includes a background scan image 552 aligned to a tube current axis 554. Tube current values lines 556 are overlaid on the background scan image 552 and, in combination with the tube current axis 554, denote relative tube current values associated with different scans. Organ bars 558A-B are set below the background image scan 552 and indicate particular regions associated with the values of the tube current values lines 556, such as lungs bar 558B and abdomen bar 558A.

The background scan image 552 may be a historical image, default normative image, or an artificial image, depending on the comparison being reviewed in the patient context view 550. For example, where comparing across different patients, a schematic anatomy sketch or a phantom scan may be used for the background scan image 552. In contrast, when the patient context view 550 is being used to compare tube current modulation values across multiple scans of the same patient, a preferable real scan may be used, such as an earlier scan or a patient scan which best conforms to certain image quality thresholds or the like.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer-implemented method for visualizing tube current modulations in a patient scan, the method comprising:

accessing one or more x-ray tube current values for a portion of the patient scan, the one or more x-ray tube current values corresponding to x-ray tubes used to perform the portion of the patient scan;

mapping the accessed one or more x-ray tube current values to an area of a scout scan associated with the patient scan; and applying a transformation function to the area of the scout scan to yield a transformed scout scan, the transformation function based on the accessed tube current values;

wherein the area of the scout scan contrasts adjacent other areas of the scout scan when displayed to a user.

2. The computer-implemented method of claim 1, wherein the transformation function comprises a pixel color conversion of pixels of the scout scan to a new color corresponding to the accessed one or more x-ray tube current values.

3. The computer-implemented method of claim 2, wherein the transformation function further comprises a saturation transformation function to modulate opacity of the new color.

4. The computer-implemented method of claim 1, further comprising normalizing the accessed tube current values.

5. The computer-implemented method of claim 1, wherein the one or more x-ray tube current values are located in a metadata field of a Digital Imaging and Communication in Medicine (DICOM) header file.

6. The computer-implemented method of claim 1, further comprising:
accessing a plurality of other patient scans related to the patient scan based on one or more of patient information or scanned anatomy, the plurality of other patient scans comprising other x-ray tube current values;
identifying other x-ray tube current values that correspond to the one or more x-ray tube current values, the correspondence based on anatomical areas for which the other x-ray tube current values and the one or more x-ray tube current values were generated; and
displaying the identified other x-ray tube current values to the user.

7. The computer-implemented method of claim 6, further comprising
generating one or more tube current fingerprints based on one or more of the x-ray tube current values or the identified other x-ray tube current values, each fingerprint comprising sequential colored line segments, each segment corresponding to an anatomical region and each color based on the x-ray tube current values or the identified other x-ray tube current values; and
displaying the one or more tube current fingerprints to the user in a stacked formation, each of the fingerprints coaligned according to respective sequential colored line segments.

8. The computer-implemented method of claim 6, further comprising
determining an average x-ray tube current value for one of the anatomical areas based on the identified other x-ray tube current values;
applying the transformation function to the determined average x-ray tube current value to yield a transformed value; and
displaying the transformed value to the user in association with the one of the anatomical areas and displayed area of the scout scan.

9. A system for visualizing tube current modulations in a patient scan, the system comprising
a medical diagnostic imaging device;
a display communicatively coupled to the diagnostic imaging device; and
a computing device configured to:
access one or more x-ray tube current values for a portion of the patient scan, the one or more x-ray tube current values corresponding to x-ray tubes of the medical diagnostic imaging device used to perform the portion of the patient scan;
map the accessed one or more x-ray tube current values to an area of a scout scan associated with the patient scan;
apply a transformation function to the area of the scout scan to yield a transformed scout scan, the transformation function based on the accessed tube current values; and
display the transformed scout scan on the display;
wherein the area of the scout scan contrasts adjacent other areas of the scout scan when displayed to a user.

10. The system of claim 9, wherein the transformation function comprises a pixel color conversion of pixels of the scout scan to a new color corresponding to the accessed one or more x-ray tube current values.

11. The system of claim 10, wherein the transformation function further comprises a saturation transformation function to modulate opacity of the new color.

12. The system of claim 9, further comprising normalizing the accessed tube current values.

13. The system of claim 9, wherein the one or more x-ray tube current values are located in a metadata field of a Digital Imaging and Communication in Medicine (DICOM) header file.

14. The system of claim 9, wherein the computing device is further configured to:
access a plurality of other patient scans related to the patient scan based on one or more of patient information or scanned anatomy, the plurality of other patient scans comprising other x-ray tube current values;
identify other x-ray tube current values that correspond to the one or more x-ray tube current values, the correspondence based on anatomical areas for which the other x-ray tube current values and the one or more x-ray tube current values were generated; and
display the identified other x-ray tube current values to the user.

15. The system of claim 14, wherein the computing device is further configured to:
generate one or more tube current fingerprints based on one or more of the x-ray tube current values or the identified other x-ray tube current values, each fingerprint comprising sequential colored line segments, each segment corresponding to an anatomical region and each color based on the x-ray tube current values or the identified other x-ray tube current values; and
display the one or more tube current fingerprints to the user in a stacked formation, each of the fingerprints coaligned according to respective sequential colored line segments.

16. The system of claim 14, wherein the computing device is further configured to:
determine an average x-ray tube current value for one of the anatomical areas based on the identified other x-ray tube current values;
apply the transformation function to the determined average x-ray tube current value to yield a transformed value; and
display the transformed value to the user in association with the one of the anatomical areas and displayed area of the scout scan.

17. A non-transitory computer readable medium storing instructions that, when executed by one or more processors, cause the one or more processors to:
access one or more x-ray tube current values for a portion of a patient scan, the one or more x-ray tube current values corresponding to x-ray tubes used to perform the portion of the patient scan and located in a metadata field of a Digital Imaging and Communication in Medicine (DICOM) header file;

map the accessed one or more x-ray tube current values to an area of a scout scan associated with the patient scan; and apply a transformation function to the area of the scout scan to yield a transformed scout scan, the transformation function based on the accessed tube current values, the transformation function comprising:
   a pixel color conversion of pixels of the scout scan to a new color corresponding to the accessed one or more x-ray tube current values; and
   a saturation transformation function to modulate opacity of the new color;

wherein the area of the scout scan contrasts adjacent other areas of the scout scan when displayed to a user.

18. The non-transitory computer readable medium of claim 17, wherein the instructions further cause the one or more processors to:
   access a plurality of other patient scans related to the patient scan based on one or more of patient information or scanned anatomy, the plurality of other patient scans comprising other x-ray tube current values;
   identify other x-ray tube current values that correspond to the one or more x-ray tube current values, the correspondence based on anatomical areas for which the other x-ray tube current values and the one or more x-ray tube current values were generated;
   display the identified other x-ray tube current values to the user.

19. The non-transitory computer readable medium of claim 18, wherein the instructions further cause the one or more processors to:
   generate one or more tube current fingerprints based on one or more of the x-ray tube current values or the identified other x-ray tube current values, each fingerprint comprising sequential colored line segments, each segment corresponding to an anatomical region and each color based on the x-ray tube current values or the identified other x-ray tube current values; and
   display the one or more tube current fingerprints to the user in a stacked formation, each of the fingerprints coaligned according to respective sequential colored line segments.

20. The non-transitory computer readable medium of claim 18, wherein the instructions further cause the one or more processors to:
   determine an average x-ray tube current value for one of the anatomical areas based on the identified other x-ray tube current values;
   apply the transformation function to the determined average x-ray tube current value to yield a transformed value; and
   display the transformed value to the user in association with the one of the anatomical areas and displayed area of the scout scan.

* * * * *